(12) United States Patent
Yang et al.

(10) Patent No.: US 12,335,797 B2
(45) Date of Patent: Jun. 17, 2025

(54) NEIGHBOR CELL CSI REPORT SENDING METHOD, NEIGHBOR CELL CSI REPORT RECEIVING METHOD, AND RELATED DEVICES

(71) Applicant: VIVO MOBILE COMMUNICATION CO., LTD., Guangdong (CN)

(72) Inventors: Ang Yang, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 407 days.

(21) Appl. No.: 17/830,943

(22) Filed: Jun. 2, 2022

(65) Prior Publication Data

US 2022/0295367 A1    Sep. 15, 2022

Related U.S. Application Data

(63) Continuation of application No. PCT/CN2020/132630, filed on Nov. 30, 2020.

(30) Foreign Application Priority Data

Dec. 5, 2019 (CN) .......................... 201911236630.8

(51) Int. Cl.
  *H04W 36/00*    (2009.01)
  *H04L 5/00*     (2006.01)
  *H04W 36/18*    (2009.01)

(52) U.S. Cl.
  CPC ....... *H04W 36/0058* (2018.08); *H04L 5/0051* (2013.01); *H04W 36/0061* (2013.01); *H04W 36/185* (2023.05)

(58) Field of Classification Search
  None
  See application file for complete search history.

(56) References Cited

U.S. PATENT DOCUMENTS

| | | | |
|---|---|---|---|
| 2019/0173553 | A1 | 6/2019 | Park et al. |
| 2021/0111846 | A1* | 4/2021 | Lee ............ H04L 5/0053 |
| 2022/0295323 | A1 | 9/2022 | Wang |

FOREIGN PATENT DOCUMENTS

| | | |
|---|---|---|
| CN | 110381531 A | 10/2019 |
| WO | 2019108114 A1 | 6/2019 |
| WO | 2019212224 A1 | 11/2019 |

OTHER PUBLICATIONS

1$^{st}$ Chinese Office Action, English Translation.
International Search Report and Written Opinion, English Translation.
CN110381531A, English Abstract and U.S. Equivalent U.S. Pub. No. 2022/0295323.

(Continued)

*Primary Examiner* — Kouroush Mohebbi
(74) *Attorney, Agent, or Firm* — BROOKS KUSHMAN P.C.

(57) ABSTRACT

A neighbor cell channel state information CSI report sending method, a neighbor cell channel state information CSI report receiving method, and related devices. The method includes: sending a CSI report to a serving cell at a physical layer, where the CSI report includes first reporting information corresponding to a target reference signal RS of a neighbor cell.

20 Claims, 3 Drawing Sheets

Send a CSI report to a serving cell at a physical layer, where the CSI report includes first reporting information corresponding to a target reference signal RS of the neighbor cell — 201

(56) References Cited

OTHER PUBLICATIONS

Extended European Search Report for Application No. 20895940.3-1216, dated Jan. 5, 2023, 11 pages.
Mediatek Inc: "Physical layer feasibility considerations for mobility enhancement", 3GPP Draft; RI-1908392, Prague, CZ, Aug. 17, 2019.
Qualcomm Incorporated: "Summary #2 of 7.2.10.4: PHY procedures for positioning measurements", 3GPP Draft; RI-1911627, Chongqing, China, Oct. 22, 2019.
ZTE ZTE Microelectronics: "Consideration on the mobility without RRC involvement", 3GPP Draft; R2-1702825, Spokane, USA, Mar. 24, 2017.
First Office Action for Chinese Application No. 201911236630.8, dated Sep. 27, 2021, 10 Pages.
International Search Report and Written Opinion for Application No. PCT/CN2020/132630, dated Feb. 25, 2021, 8 Pages.
Ericsson, "Details on Lower-layer Mobility Enhancements," 3GPP TSG-RAN WG1 #96, Agenda item 7.2.12.2, Apr. 8-12, 2019, R1-1905162, Xi'an, China, 8 Pages.
Ericsson, "Details on Lower-layer Mobility Enhancements," 3GPP TSG-RAN WG1 #97, Agenda item 7.2.12.2, May 13-17, 2019, R1-1907435, Reno, NV, USA, 8 Pages.
Ericsson, "Lower-layer Mobility Enhancements," 3GPP TSG-RAN WG1 #98bis, Agenda item 7.2.12.2, Oct. 14-20, 2019, R1-1911226, Chongqing, China, 9 Pages.
Ericsson, "Lower-layer Mobility Enhancements," 3GPP TSG-RAN WG1 #99, Agenda item 7.2.12.2, Nov. 18-22, 2019, R1-1912060, Reno, NV, USA, 9 Pages.
LG Electronics, "Discussion on Measurement and Report in NR SL," 3GPP TSG RAN WG2 #108, Agenda item 6.4.2, Nov. 18-22, 2019, R1-1915517, Reno, NV, USA, 6 Pages.

* cited by examiner

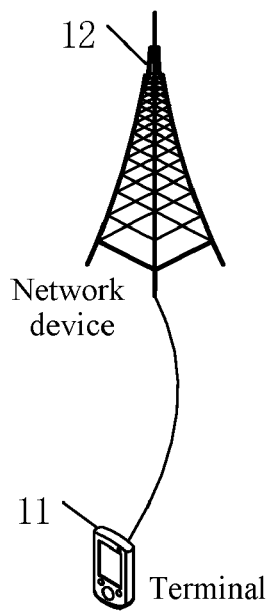

FIG. 1

Send a CSI report to a serving cell at a physical layer, where the CSI report includes first reporting information corresponding to a target reference signal RS of the neighbor cell — 201

FIG. 2

Receive a CSI report sent by the terminal at a physical layer, where the CSI report includes first reporting information corresponding to a target reference signal RS of a neighbor cell — 301

FIG. 3

NEIGHBOR CELL CSI REPORT SENDING METHOD, NEIGHBOR CELL CSI REPORT RECEIVING METHOD, AND RELATED DEVICES

CROSS-REFERENCE TO RELATED APPLICATIONS

This application is a continuation of International Application No. PCT/CN2020/132630 filed on Nov. 30, 2020, which claims priority to Chinese Patent Application No. 201911236630.8, filed on Dec. 5, 2019, which are hereby incorporated by reference in their entireties.

TECHNICAL FIELD

The present invention relates to the field of communication technologies, and in particular, to a neighbor cell CSI report sending method, a neighbor cell CSI report receiving method, and related devices.

BACKGROUND

In existing communication technologies, when a terminal performs cell switching or signal quality of a serving cell is poor, the terminal needs to measure a neighbor cell to obtain a corresponding measurement result, to balance whether the cell switching is required. However, current reporting of beam reporting information for the neighbor cells is all layer 3-based measurement results, and needs to be reported at a high layer, which takes a long time.

SUMMARY

Embodiments of the present invention provide a neighbor cell CSI report sending method, a neighbor cell CSI report receiving method, and related devices.

In a first aspect, the embodiments of the present invention provide a neighbor cell channel state information CSI report sending method, applicable to a terminal, the method including:
   sending a CSI report to a serving cell at a physical layer, where the CSI report includes first reporting information corresponding to a target reference signal RS of the neighbor cell.

In a second aspect, the embodiments of the present invention provide a neighbor cell channel state information CSI report receiving method, applicable to a network device of a serving cell to which a terminal belongs, the method including:
   receiving a CSI report sent by the terminal at a physical layer, where the CSI report includes first reporting information corresponding to a target reference signal RS of a neighbor cell.

In a third aspect, the embodiments of the present invention provide a terminal, including:
   a first sending module, configured to send a channel state information CSI report to a serving cell at a physical layer, where the CSI report includes first reporting information corresponding to a target reference signal RS of a neighbor cell.

In a fourth aspect, the embodiments of the present invention provide a network device, including:
   a second receiving module, configured to receive a CSI report sent by a terminal at a physical layer, where the CSI report includes first reporting information corresponding to a target reference signal RS of a neighbor cell.

In a fifth aspect, the embodiments of the present invention provide a terminal, including a memory, a processor, and a program stored in the memory and runnable on the processor, the program, when executed by the processor, implementing the steps in the foregoing neighbor cell channel state information CSI report receiving method.

In a sixth aspect, the embodiments of the present invention provide a network device, including a memory, a processor, and a program stored in the memory and runnable on the processor, the program, when executed by the processor, implementing the steps in the foregoing neighbor cell channel state information CSI report sending method.

In a seventh aspect, the embodiments of the present invention provide a computer-readable storage medium, storing a computer program, the computer program, when executed by a processor, implementing the steps in the foregoing neighbor cell channel state information CSI report sending method; or the computer program, when executed by a processor, implementing the steps in the foregoing neighbor cell channel state information CSI report receiving method.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a structural diagram of a network system to which an embodiment of the present invention is applicable;

FIG. 2 is a flowchart of a neighbor cell CSI report sending method according to an embodiment of the present invention;

FIG. 3 is a flowchart of a neighbor cell CSI report receiving method according to an embodiment of the present invention;

DETAILED DESCRIPTION

Figure 4:
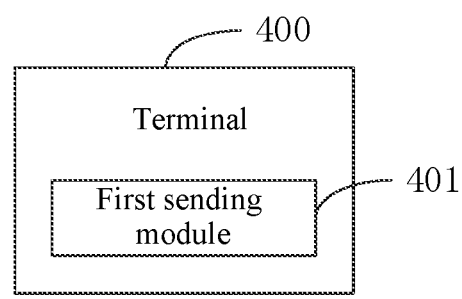
FIG. 4 is a structural diagram of a terminal according to an embodiment of the present invention.

The following clearly describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present invention.

In the description and claims of this application, the terms "include" and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, product, or device. In addition, the use of "and/or" in the description and the claims means at least one of the connected objects, for example, three conditions such as A and/or B, indicating including A alone, B alone, and both A and B present.

In this embodiment of the present invention, the word "for example" is used for representing giving an example, an illustration, or a description. Any embodiment or design solution described as an "exemplary" or "for example" in the embodiments of the present invention should not be explained as being more preferred or having more advantages than another embodiment or design solution. Exactly, use of the word "example" or "for example" or the like is intended to present a related concept in a specific manner.

The following describes the embodiments of the present invention with reference to the accompanying drawings. The embodiments of the present invention provide a neighbor cell CSI report sending method, a neighbor cell CSI report receiving method, and related devices, applicable to a wireless communication system. The wireless communication system may be a 5G system, or an Evolved Long Term Evolution (eLTE) system, or a subsequent evolved communication system.

Referring to FIG. 1, FIG. 1 is a structural diagram of a network system to which an embodiment of the present invention is applicable. FIG. 1 shows a terminal 11 and a network device 12. The terminal 11 may be a user terminal or another terminal-side device, for example, a terminal-side device such as a mobile phone, a tablet personal computer, a laptop computer, a personal digital assistant (PDA), a Mobile Internet Device (MID), or a wearable device. It should be noted that, a specific type of the terminal 11 is not limited in this embodiment of the present invention. The network device 12 may be a 5G base station, or a base station of a later version, or a base station in another communication system, or referred to as a node B, an evolved NodeB, or a transmission reception point (TRP), or an access point (AP), or another word in the field. Provided the same technical effects are achieved, the network device is not limited to a specific technical word. In addition, the network device 12 may be a master node (MN) or a secondary node (SN). It should be noted that, only the 5G base station is used as an example in this embodiment of the present invention, but a specific type of the network device is not limited.

To facilitate understanding, the following describes some content involved in this embodiment of the present invention:

1. Downlink Beam Measurement Process

Downlink beam measurement may be divided into the following three processes:

P-1: A UE measures a plurality of transmitting beams of a TRP and receiving beams of the UE, and selects transmitting beams of the TRP and receiving beams of the UE. Typical scenario: The TRP scans a plurality of transmitting beams, and the UE scans a plurality of receiving beams. The UE reports selected at least one TRP transmitting beam to the TRP.

P-2: The UE measures a plurality of transmitting beams of the TRP, and selects transmitting beams of the TRP. Typical scenario: Compared with P-1, more accurate scanning of the transmitting beams in a small range is implemented. This may be regarded as a special case of P-1. The UE reports selected at least one TRP transmitting beam to the TRP.

P-3: The UE measures a plurality of receiving beams of the UE on a same transmitting beam of the TRP, and selects receiving beams of the UE. The UE does not report to the TRP.

In the beam measurement of the foregoing processes, the measurement of each TRP transmitting beam and each UE receiving beam is implemented by configuring a synchronization signal block (Synchronization Signal and PBCH Block, SSB) resource or a channel state information (CSI)-reference signal (RS) resource. A signal on each SSB resource or each CSI-RS resource is sent through a specific transmitting beam. When the TRP transmitting beams are scanned, the transmitting beams of these resources are different; and when the UE receiving beams are scanned, the transmitting beams of these resources are the same.

2. CSI Report Setting

There are a plurality of configuration options for a report quantity "reportQuantity" in CSI Report Setting "CSI-reportConfig" of radio resource control (RRC) signaling. When "reportQuantity" is set to any of the following: a CSI-RS resource indicator (CRI) signal-to-noise and interference ratio (Signal to Interference plus Noise Ratio, SINR), an ssb Index SINR, a cri reference signal received power (RSRP), an "ssb-Index-RSRP", and "none", and when a CSI-RS is not used for tracking reference signal (TRS), it indicates that the CSI report is used for beam measurement. When "reportQuantity" is set to "none" and the CSI-RS is used for TRS, it indicates that measurement of these CSI-RSs does not need to be reported to the base station; and other settings of "reportQuantity" indicate that the CSI report is a normal CSI information report.

A parameter "reportConfigType" related to a time-domain characteristic of the CSI report may be configured as periodic, a semi persistent on physical uplink control channel (semi Persistent On PUCCH), a semi Persistent On Physical Uplink Shared Channel (semi Persistent On PUSCH), and aperiodic, respectively corresponding to a periodic CSI report, a semi persistent CSI report based on a physical uplink control channel (PUCCH), a semi persistent CSI report based on a physical uplink shared channel (PUSCH), and an aperiodic CSI report. In addition, the periodic CSI report and the semi persistent CSI report further include configuration of a reporting period and a slot offset.

One CSI report setting is associated with a CSI Resource set (CSI-RS resource set) for configuring beam management measurement or CSI Resource setting "CSI-ResourceConfig" of a SSB resource set. The CSI-RS resource setting further includes a parameter "resourceType" related to the time-domain characteristic of CSI-RS sending, and a value may be periodic, semi persistent, or aperiodic. It should be noted that, the periodic CSI report may be associated with only a periodic CSI-RS, the semi persistent CSI report may be associated with a periodic or semi persistent CSI-RS, and the aperiodic CSI report may be associated with a periodic, semi persistent, or aperiodic CSI-RS. Any CSI report may be associated with an SSB.

Based on beam management on the CSI-RS, the P-3 process may be configured as follows: "reportQuantity" in the CSI report setting is set to "none". Repetition in non-zero-power CSI-RS resource set "NZP-CSI-RS-ResourceSet" configuration in CSI resource setting associated with the non-zero-power CSI-RS resource set "NZP-CSI-RS-ResourceSet" configuration is on ("Repetition" is configured as "on"), and a TRS information CSI-RS is not used for TRS (that is, "trs-Info" does not exist).

3. Layer 3 Reporting a layer 1 filtering result is carried in the foregoing CSI report, and the UE also reports the layer 1 filtering result to a high layer of the UE. A specific layer 1 filtering algorithm is a UE implementation problem, and the protocol is not defined. The layer 1 filtering result has two purposes below. A first purpose is that the high layer of the UE then performs layer 3 filtering based on layer 1 filtering, and selects X beams for high-layer beam reporting. A second purpose is that the UE combines beam measurement results of a layer 1 to obtain a cell measurement result, including measurement results of other cells; and performs layer 3 filtering on the cell measurement result, and then evaluate, according to the measurement result and other possible measurement results, whether the measurement needs to be reported.

An L3 filtering formula is as follows:

$$F_n = (1-a) \cdot F_{n-1} + a \cdot M_n$$

$F_n$ is an updated L3 filtering result.

$M_n$ provides a newest measurement result for PHY.

$a = 1/2^{(k/4)}$, where k is a filter coefficient of corresponding measured quantity configuration.

In the prior art, the beam report of the layer 1 only includes a beam measurement result of a current cell, and a beam measurement result of a neighbor cell is only in a beam report of a layer 3. As a result, the network device cannot quickly know the beam quality of the neighbor cell, which reduces a speed of cell switching. Therefore, the embodiments of the present invention provide a new neighbor cell CSI report sending method. Referring to FIG. 2, FIG. 2 is a flowchart of a neighbor cell channel state information CSI report sending method according to an embodiment of the present invention. The method is applicable to a terminal, and as shown in FIG. 2, includes the following steps:

Step 201. Send a channel state information CSI report to a serving cell at a physical layer, where the CSI report includes first reporting information corresponding to a target reference signal RS of a neighbor cell.

The RS mentioned in this embodiment of the present invention may be understood as an SSB or a CSI-RS. The CSI report may include first reporting information corresponding to target RSs of one or more neighbor cells, and one neighbor cell may include first reporting information corresponding to one or more RSs.

The foregoing first reporting information may be understood as information reported based on a measurement result that is obtained based on beam measurement of the cell based on the target RS in a case that the terminal performs cell switching, or signal quality of the serving cell of the terminal is poor. Optionally, the first reporting information is a layer 1-based measurement result. Optionally, the first reporting information may alternatively be a layer 3-based measurement result.

In the embodiments of the present invention, first reporting information corresponding to a target RS of a neighbor cell is reported at a physical layer. Compared with that reporting information of the neighbor cell is reported at a high layer in the prior art, a reporting time of beam reporting information of the neighbor cell is shortened, thereby increasing a speed of cell switching. Therefore, the embodiments of the present invention improve the performance of a communication system.

Optionally, an activation condition for sending the first reporting information corresponding to the target RS of the neighbor cell to the serving cell at the physical layer may be selected by the terminal, set in a protocol by default, configured by a network device, or activated by a network device through signaling. In other words, in this embodiment of the present invention, the step 201 includes any one of the following:

sending, by the terminal, the CSI report to the serving cell at the physical layer through protocol default;

triggering, according to target signaling sent by a network device, the terminal to send the CSI report to the serving cell at the physical layer;

triggering, according to target configuration sent by the network device, the terminal to send the CSI report to the serving cell at the physical layer;

triggering, in a case that a first preset condition is met, the terminal to send the CSI report to the serving cell at the physical layer; and sending the channel state information CSI report to the serving cell at the physical layer in a case that the terminal determines that the first reporting information is sent at the physical layer.

That the terminal sends the CSI report to the serving cell at the physical layer is set in a protocol by default may be understood that first reporting information corresponding to all the neighbor cells may be reported at the physical layer through protocol agreement.

the triggering, according to target signaling sent by a network device, the terminal to send the CSI report to the serving cell at the physical layer may be understood as triggering, by using specified signaling, the terminal to report first reporting information of a neighbor cell specified in the signaling. For example, in an embodiment, the target signaling meets any one of the following:

condition 1: being used for configuring, activating, or updating N neighbor cells, where N is a positive integer;

condition 2: being used for indicating dual active protocol stack (DAPS) handover; and condition 3: being used for configuring a secondary cell group. For example, for the condition 1, the neighbor cell in the step 201 is included in the foregoing N neighbor cells. Specifically, the target signaling may carry cell identifiers of the N neighbor cells, or related information used for representing cell identifiers of the N neighbor cells.

For the condition 2, the target signaling may be specifically expressed as daps handover (HO) configuration (dapsHO-Config) signaling, or signaling related to dapsHO-Config, or another signaling related to daps HO. In this case, the neighbor cell in the step 201 is included in a cell associated with daps HO-Config. It should be understood that, a behavior of sending the channel state information CSI report to the serving cell at the physical layer occurs after RRC reconfiguration.

For the condition 3, the foregoing target signaling may be specifically expressed as a secondary cell group (secondaryCellGroup) or signaling related to a secondary cell group. For example, the signaling related to the secondary cell group may include secondary cell group configuration (mrdc-SecondaryCellGroupConfig) of a multi-radio access technology (Radio Access Technology, RAT) dual connectivity or a secondary cell group configuration (nr-SecondaryCellGroupConfig) of a new air interface. In this case, the neighbor cell in the step 201 is included in a cell associated with SecondaryCellGroupConfig. It should be understood that, a behavior of sending the channel state information CSI report to the serving cell at the physical layer occurs after RRC reconfiguration.

In this embodiment of the present invention, because the reporting of the first reporting information corresponding to the target RS of the neighbor cell at the physical layer is triggered by using the target signaling sent by the network device, the pertinence of reporting the first reporting information corresponding to the target RS of the neighbor cell at the physical layer can be improved, and the utilization of physical layer resources can be improved.

Optionally, the target configuration includes any one of the following:

CSI measurement configuration (CSI-MeasConfig), where the CSI measurement configuration indicates a neighbor cell;

CSI reporting configuration (CSI-ReportConfig), where the CSI reporting configuration indicates a neighbor cell;

CSI resource setting (CSI-ResourceConfig), where the CSI resource setting indicates a neighbor cell;

non-zero-power CSI reference signal resource set configuration (NZP-CSI-RS-ResourceSet), where the non-zero-power CSI reference signal resource set configuration indicates a neighbor cell; and CSI synchronization signal block resource set configuration (CSI-SSB-ResourceSet), where the CSI synchronization signal block resource set configuration indicates a neighbor cell.

It should be understood that, in this embodiment of the present invention, the neighbor cell in the step 201 is included in a neighbor cell indicated by the target configuration. In the target configuration, the neighbor cell may be indicated by at least one of the following:

a cell index (ID);
information used for representing a cell ID; and
related signaling.

All CSI-RS of NZP-CSI-RS-ResourceSet may be CSI-RSs of the neighbor cell, or some of CSI-RSs may be CSI-RSs of the neighbor cell (in other words, NZP-CSI-RS-ResourceSet includes CSI-RSs of the neighbor cell and CSI-RSs of the serving cell).

In addition, all SSBs of CSI-SSB-ResourceSet may be SSBs of the neighbor cell, or some of SSBs may be SSBs of the neighbor cell (in other words, CSI-SSB-ResourceSet includes SSBs of the neighbor cell and SSBs of the serving cell).

In this embodiment of the present invention, because the reporting of the first reporting information corresponding to the target RS of the neighbor cell at the physical layer is triggered by using the target configuration sent by the network device, the pertinence of reporting the first reporting information corresponding to the target RS of the neighbor cell at the physical layer can be improved, and the utilization of physical layer resources can be improved.

Optionally, the triggering, in a case that a first preset condition is met, the terminal to send the CSI report to the serving cell at the physical layer may be understood that the terminal determines, according to a specific rule, whether to send the first reporting information corresponding to the target RS of the neighbor cell at the physical layer. The first preset condition includes at least one of the following:

channel quality of the serving cell is less than a first preset value; and channel quality of Q neighbor cells is greater than a second preset value, and Q is a positive integer.

In other words, in this embodiment of the present invention, the first preset condition is related to channel quality of the serving cell and channel quality of the neighbor cell, where the channel quality of the serving cell may be understood as cell quality of the serving cell. In an embodiment, the channel quality of the serving cell being less than the first preset value may be understood that a RSRP, reference signal received quality (RSRQ), or received signal strength indication (RSRQ) of L1 or L3 of N1 beams of the serving cell is less than the first preset value. The first preset value may be configured by the network device or set in a protocol by default. The channel quality of the neighbor cell may be understood as cell quality of the neighbor cell. In an embodiment, the channel quality of the neighbor cell being greater than the second preset value may be understood that an RSRP, RSRQ or an SINR of L1 or L3 of N2 beams in the neighbor cell is greater than the second preset value. Values of the second preset value and Q may both be configured by the network device or set in a protocol by agreement.

In this embodiment of the present invention, because the reporting of the first reporting information corresponding to the RS of the neighbor cell at the physical layer is limited by agreement through the first preset condition, the pertinence of reporting the first reporting information corresponding to the RS of the neighbor cell at the physical layer can be improved, and the utilization of physical layer resources can be improved.

Optionally, in an embodiment, the first reporting information may include at least one of the following:

first indication information, where the first indication information is used for indicating the neighbor cell;
a RS identifier; and
beam quality.

The RS identifier may be understood as an index of the target RS, and the beam quality may be understood as an L1-RSRP and/or an L1-SINR of beams corresponding to the target RS.

Further, in an optional embodiment, in a case that the CSI report includes continuous M pieces of first reporting information of a same neighbor cell, only target reporting information includes the first indication information, and the target reporting information includes at least one of the following:

a first piece of first reporting information in the M pieces of first reporting information; and a last piece of first reporting information in the M pieces of first reporting information, where M is an integer greater than 1.

In this embodiment of the present invention, first reporting information corresponding to all the target RSs of the same neighbor cell is located in continuous positions of the CSI report. In other words, the M pieces of first reporting information do not include reporting information corresponding to RSs of other cells. In this case, the first indication information may be carried in a first piece of first reporting information only, or the first indication information may be carried in a last piece of first reporting information only, or the first indication information is carried in a first piece of first reporting information and a last piece of first reporting information only. In this way, the amount of information reporting can be reduced and resource overheads can be reduced.

Further, in a case that a second preset condition is met, the first reporting information includes at least one of the reference signal identifier and the beam quality, and the second preset condition includes any one of the following:

configuration information of the CSI report includes second indication information, where the second indication information is used for instructing the CSI report to report first reporting information corresponding to a target RS of at least one neighbor cell;

the terminal sends a notification message to a network device, the notification message is used for notifying the network device to report first reporting information corresponding to a target RS of one neighbor cell in the CSI report, and the notification message and the CSI report are carried in different signaling;

the configuration information of the CSI report includes a quantity of first RSs reported by the serving cell and/or a quantity of second RSs reported by the neighbor cell; and the CSI report includes the quantity of first RSs reported by the serving cell and/or the quantity of second RSs reported by the neighbor cell.

The quantity of second RSs reported by the neighbor cell may be understood as a maximum value, a minimum value, or a given value of the quantity of RSs reported by the neighbor cell.

Specifically, the quantity of RSs reported by the neighbor cell may be configured by a network, set in a protocol by default, selected by the terminal, or limited by a terminal capability. Being limited by a terminal capability refer to limiting conditions such as a quantity of CSI processing units (CPUs) of the terminal, a maximum quantity of SSBs that the terminal can detect, and a frequency range supported by the terminal to limit the quantity of RSs reported by the neighbor cell.

Optionally, the quantity of second RSs may be determined according to preset parameters, and the preset parameters include:

a quantity of neighbor cells;

quantities of RSs reported by the neighbor cells;

a sum of the quantities of RSs reported by the neighbor cells; and a sum of quantities of RSs with beam quality exceeding a third preset value in the neighbor cells.

A magnitude of the third preset value may be configured by the network device, or set in a protocol by default, or selected by the terminal. A meaning of the preset parameters may be specifically understood as a specified value, a maximum value, or a minimum value. A quantity of neighbor cells is used as an example, and may be understood as specified quantities reported by the neighbor cells, or maximum quantities reported by the neighbor cells, or minimum quantities reported by the neighbor cells.

Further, in an optional embodiment, the CSI report further includes second reporting information corresponding to RSs of the serving cell.

In this embodiment, a RS reporting priority of the serving cell and a target RS reporting priority of the neighbor cell may be set according to actual requirements. For example, in this embodiment of the present invention, the RS reporting priority of the serving cell may be set to be greater than the RS reporting priority of the neighbor cell. In other words, a priority of the second reporting information is greater than a priority of the first reporting information.

Optionally, in an embodiment, in the CSI report, the second reporting information corresponding to the RSs of the serving cell is in front of the CSI report.

In another embodiment, the network device directly or indirectly indicates through signaling, or specifies through protocol agreement positions of the second reporting information corresponding to the RSs of the serving cell in the CSI report. In this case, if second reporting information corresponding to N RSs of the serving cell is reported in the CSI report, reporting information corresponding to preceding or following N RSs is the second reporting information corresponding to the RSs of the serving cell.

Further, a priority of the first reporting information corresponding to a target RS of each neighbor cell may be determined by any one of the following:

a cell identifier of each neighbor cell;

a distance between each neighbor cell and the serving cell;

cell channel quality obtained through layer 3 filtering;

beam quality obtained through layer 1 filtering;

beam quality obtained through layer 3 filtering;

a cell priority configured by a network device; and a priority determined by the terminal according to a preset rule.

Further, the target RS meets any one of the following:

first L RSs with beam quality sorted from high to low in a target neighbor cell, where L is a positive integer;

L RSs in the target neighbor cell;

1 RS in K RSs in the target neighbor cell, where beam quality of the 1 RS is used for indicating average beam quality of the K RSs, and K is a positive integer; and L RSs with beam quality greater than a fourth preset value in the target neighbor cell, where the target neighbor cell is a neighbor cell in which the target RS is located.

In an embodiment, in a case that no reporting threshold is set (the reporting threshold may be configured by the network device or set in a protocol by default), the K RSs include any one of the following:

all RSs of the target neighbor cell;

first K RSs with beam quality sorted from high to low in all the RSs of the target neighbor cell; and K RSs in all the RSs of the target neighbor cell.

In another embodiment, if the reporting threshold is set, the following two cases are included:

Case 1: in a case that RSs with beam quality greater than a fifth preset value exist in the RSs of the target neighbor cell, the K RSs include any one of the following:

all RSs in a third RS;

first K RSs with beam quality sorted from high to low in the third RS; and

K RSs in the third RS, where the third RS is all RSs with beam quality greater than the fifth preset value in all the RSs of the target neighbor cell.

It should be understood that, a value of K may be set in a protocol by agreement or configured by the network device. Specifically, if a quantity of third RSs is less than or equal to K, the K RSs may be understood as all the third RSs; and if the quantity of third RSs is greater than K, the K RSs may be understood as K RSs in the third RSs.

Case 2: in a case that RSs with beam quality greater than the fifth preset value do not exist in the RSs of the target neighbor cell, the K RSs include any one of the following:

all RSs of the target neighbor cell;

first K RSs with beam quality sorted from high to low in all the RSs of the target neighbor cell; and K RSs in all the RSs of the target neighbor cell.

Further, before the sending a channel state information CSI report to a serving cell at a physical layer, the method further includes:

receiving CSI reporting configuration sent by a network device, used for configuring the terminal to report the first reporting information at the physical layer, where a report quantity in the CSI reporting configuration is configured as any one of the following:

none;

channel state information reference signal resource indication-reference signal received power (cri-RSRP);

synchronization signal block-index-RSRP (ssb-Index-RSRP);

channel state information reference signal resource indication-signal to interference plus noise ratio (cri-SINK); and synchronization signal block-index-signal to interference plus noise ratio (ssb-Index-SINR).

In other words, in this embodiment, the foregoing CSI includes any one of the following:

a CSI report in which a report quantity in CSI report setting is configured as none;

a CSI report in which the report quantity in the CSI report setting is configured as cri-RSRP;

a CSI report in which the report quantity in the CSI report setting is configured as ssb-Index-RSRP;

a CSI report in which the report quantity in the CSI report setting is configured as CRI-SINR; and a CSI report in which the report quantity in the CSI report setting is configured as ssb-Index-SINR.

Further, in an optional embodiment, in a case that group-based beam reporting in the CSI reporting configuration is configured to be enabled, the CSI report further includes second reporting information corresponding to RSs of the serving cell.

To better understand the present invention, specific implementation of the beam report is described in detail below by using specific examples.

The beam report is a CSI report in which high layer signaling reportQuantity in CSI-ReportConfig is configured as one of the following: none, cri-RSRP, ssb-Index-RSRP, cri-SINR, and ssb-Index-SINR.

The beam report includes RSs of other physical cell (that is, neighbor cell) IDs.

An activation manner for the beam report may include any one of the following: being selected by the terminal, being set in a protocol by default, being configured by the network device, or being activated through specific signaling.

Optionally, in an embodiment, the network device may also configure, activate, and update one or more IDs of other physical cells.

Optionally, in an embodiment, the foregoing signaling may be dapsHO-Config or related signaling. In this case, the other physical cells are cells associated with dapsHO-Config, and the beam report occurs after RRC reconfiguration.

Optionally, in an embodiment, the signaling is secondaryCellGroup or related signaling (mrdc-SecondaryCellGroupConfig or nr-SecondaryCellGroupConfig). In this case, the other physical cells are cells associated with secondaryCellGroup, and the beam report occurs after RRC reconfiguration.

Optionally, in an embodiment, the network device may be configured with at least one of the following in the target configuration: a neighbor cell ID, information representing an ID of the neighbor cell, and signaling. The target configuration may be one of CSI-MeasConfig, CSI-ReportConfig, CSI-ResourceConfig, NZP-CSI-RS-ResourceSet, and CSI-SSB-ResourceSet.

Optionally, in an embodiment, the network device may be configured with some conditions, and in a case that the conditions are met, functions of the foregoing beam report are activated. The conditions are related to the channel quality of the serving cell and/or channel quality of other physical cells. Specifically, the conditions may include at least one of the following:

Condition A: the channel quality of the serving cell is less than a first preset value, and the first preset value is configured by the network device or set in a protocol by default. Optionally, the RSRP, the RSRQ or the SINR of L1 or L3 of the N1 beams of the serving cell is less than the first preset value.

Condition B: channel quality of Q neighbor cells is greater than a second preset value, and values of the second preset value and Q may both be configured by the network device or set in a protocol by agreement. Optionally, the channel quality of the Q neighbor cells being greater than the second preset value may be understood that an RSRP, RSRQ or an SINR of L1 or L3 of N2 beams in the Q neighbor cells is greater than the second preset value.

Optionally, in the beam report, RS reported content of other physical cell IDs includes at least one of first indication information, RS IDs, and beam quality, and the first indication information may include physical cell IDs or information related to physical cell IDs, or indication information indicating other cells.

For RS reporting of a same physical cell, the first indication information may be carried in a first piece of RS reporting information belonging to the physical cell only, and the first indication information is omitted in following RS reporting information; In other words, RS reporting information from the first piece of RS reporting information that carries the first indication information to the last piece of continuous RS reporting information that does not carry the first indication information is the RS reporting information of other physical cells corresponding to the first indication information.

Optionally, in an embodiment, when the reported content in the beam report includes at least one of the RS IDs and the beam quality, one of the following conditions should be met:

the network device configures only one or more other physical cells for the beam report, or the terminal informs only the network of one other physical cell through other signaling; and a quantity of RSs of the serving cell and/or a quantity of RSs of other physical cells reported in the report has been configured by the network or set in a protocol by default.

Optionally, the quantity of RSs is a maximum value, a minimum value, or a given value.

Optionally, the RS is only the SSB. That is, the RS ID is the SSB index.

Optionally, the beam quality is an L1-RSRP or an L1-SINR.

Optionally, the RSs of the serving cell may be reported preferentially.

Optionally, the RSs of the serving cell are in front of the beam report.

In an embodiment, RSs that do not carry the cell ID or other information representing the cell ID are the RSs of the serving cell.

In an embodiment, if the network device directly or indirectly indicates through signaling, or specifies through the protocol default a quantity N of RSs of the current cell in the beam report, preceding or following N RSs are the RSs of the current cell.

Optionally, a RS reporting quantity of other physical cell IDs may be configured by the network, set in a protocol by default, selected by the UE, or limited by a UE capability. Being limited by a UE capability includes a quantity of CSI processing units (CPUs) of the UE, a maximum quantity of SSBs that the UE can detect, a frequency range supported by the UE, and the like.

The RS reporting quantity of other physical cell IDs is determined by at least one of the following:
  in addition to the serving cell, a quantity of other physical cells (a specified value, a maximum value, or a minimum value);
  in addition to the serving cell, a quantity of RSs reported by each physical cell (a specified value, a maximum value, or a minimum value);
  in addition to the serving cell, a sum of RSs reported by other physical cells (a specified value, a maximum value, or a minimum value); and
  in addition to the serving cell, a sum of the RSs reported by other physical cells exceeding a beam quality threshold (a specified value, a maximum value, or a minimum value). The beam quality threshold is configured by the network device, set in a protocol by default, or selected by the terminal.

Further, a priority among other physical cells is configured by the network, set in a protocol by default, or selected by the UE. Specifically, the priority may be determined by using any one of the following:
  determining the priority according to a size of other physical cell IDs or other cell ID information, where for example, a larger cell ID corresponds to a higher priority, or a smaller cell ID corresponds to a higher priority;
  determining the priority according to a distance of other physical cells from the serving cell;
  determining the priority according to a cell situation of other physical cells, such as cell channel quality obtained through L3 filtering, or beam quality obtained through L1/L3 filtering; and
  determining priority configured by the network or selected by the UE.

Further, RS reporting limitations for other physical cell IDs are configured by the network, set in a protocol by default, or selected by the UE, and include any one of the following parameters:
  best K RSs reported by each physical cell, or
  K RSs reported by each physical cell at most (that is, there is no limitation of "best");
  1 RS reported by each physical cell, where beam quality of the RS is an average of a plurality of RSs; and
  K RSs reported by each physical cell exceeding a beam quality threshold; and
  for a case in which 1 RS is reported by each physical cell, where the beam quality of the RS is the average of the plurality of RSs, a calculation range may include:
    1: K RSs or best K RSs or all RSs; and
    2: if there is a beam quality threshold, two cases are included below. Case 1: if beam quality of at least one RS exceeds the threshold, the calculation range is the K RSs or the best K RSs or all the RSs exceeding the threshold. Case 2: if beam quality of no RS exceeds the threshold, the calculation range is the K RSs, the best K RSs, or all the RSs in all the RSs. Further, for the case 2, the RSs of the cell may not be reported.

An average calculation method includes one of or a simple combination of at least two of arithmetic average, geometric average, harmonic average, square average, weighted average, minimum value maximization, and maximum value minimization. This is not further limited herein.

Optionally, K=1.

Further, if higher layer signaling groupBasedBeamReporting is configured as "enable", the UE reports reporting information corresponding to RSs of K serving cells and reporting information corresponding to RSs of L other Physical cells in a beam report. In this embodiment, the UE may receive CSI-RS resources and/or SSB resources simultaneously by using a spatial-domain receive filter or a plurality of spatial-domain receive filters.

Optionally, a quantity of K and L is set in a protocol by default, configured by the network device, or selected by the UE.

Optionally, K=1, and L=1.

Optionally, the reported content carries or does not carry other physical cell IDs or the information reporting the cell IDs. This behavior is set in a protocol by default, configured by the network device, or selected by the UE.

Optionally, a selection of L RSs: RSs of other physical cells are best L RSs of all other cells, or L RSs of a best cell in other cells.

Optionally, the best cell is determined by cell quality obtained through L3 filtering, or determined by the beam quality obtained through L1/L3 filtering, or configured by the network device, or selected by the UE.

Optionally, beam quality of the RSs of other cells needs to exceed a specific threshold.

Referring to FIG. 3, FIG. 3 is a flowchart of a CSI report receiving method according to an embodiment of the present invention. The method is applicable to a network device of a serving cell to which a terminal belongs, and as shown in FIG. 3, includes the following steps:

Step 301. Receive a CSI report sent by a terminal at a physical layer, where the CSI report includes first reporting information corresponding to a target reference signal RS of a neighbor cell.

Optionally, the receiving a CSI report sent by the terminal at a physical layer meets any one of the following:
  sending, by the terminal, the CSI report to the serving cell at the physical layer through protocol default;
  sending target signaling to the terminal, to trigger the terminal to send the CSI report to the serving cell at the physical layer;
  sending target configuration to the terminal, to trigger the terminal to send the CSI report to the serving cell at the physical layer;
  triggering, in a case that a first preset condition is met, the terminal to send the CSI report to the serving cell at the physical layer; and
  sending, by the terminal, the channel state information CSI report to the serving cell at the physical layer in a case that the terminal determines that the first reporting information is sent at the physical layer.

Optionally, the target signaling meets any one of the following:
  being used for configuring, activating, or updating N neighbor cells, where N is a positive integer;
  being used for indicating dual active protocol stack handover; and
  being used for configuring a secondary cell group.

Optionally, the target configuration includes any one of the following:

CSI measurement configuration, where the CSI measurement configuration indicates a neighbor cell;
CSI reporting configuration, where the CSI reporting configuration indicates a neighbor cell;
CSI resource setting, where the CSI resource setting indicates a neighbor cell;
non-zero-power CSI reference signal resource set configuration, where the non-zero-power CSI reference signal resource set configuration indicates a neighbor cell; and
CSI synchronization signal block resource set configuration, where the CSI synchronization signal block resource set configuration indicates a neighbor cell.

Optionally, the first preset condition includes at least one of the following:
channel quality of the serving cell is less than a first preset value; and
channel quality of Q neighbor cells is greater than a second preset value, and Q is a positive integer.

Optionally, the first reporting information includes at least one of the following:
first indication information, where the first indication information is used for indicating the neighbor cell;
a RS identifier; and
beam quality.

Optionally, in a case that the CSI report includes continuous M pieces of first reporting information of a same neighbor cell, only target reporting information includes the first indication information, and the target reporting information includes at least one of the following:
a first piece of first reporting information in the M pieces of first reporting information; and
a last piece of first reporting information in the M pieces of first reporting information, where
M is an integer greater than 1.

Optionally, in a case that a second preset condition is met, the first reporting information includes at least one of the reference signal identifier and the beam quality, and the second preset condition includes any one of the following:
configuration information of the CSI report includes second indication information, where the second indication information is used for instructing the CSI report to report first reporting information corresponding to a target RS of at least one neighbor cell;
the terminal sends a notification message to a network device, the notification message is used for notifying the network device to report first reporting information corresponding to a target RS of one neighbor cell in the CSI report, and the notification message and the CSI report are carried in different signaling;
the configuration information of the CSI report includes a quantity of first RSs reported by the serving cell and/or a quantity of second RSs reported by the neighbor cell; and
the CSI report includes the quantity of first RSs reported by the serving cell and/or the quantity of second RSs reported by the neighbor cell.

Optionally, the quantity of second RSs is determined according to preset parameters, and the preset parameters include:
a quantity of neighbor cells;
quantities of RSs reported by the neighbor cells;
a sum of the quantities of RSs reported by the neighbor cells; and
a sum of quantities of RSs with beam quality exceeding a third preset value in the neighbor cells.

Optionally, the CSI report further includes second reporting information corresponding to a RS of the serving cell.

Optionally, a priority of the second reporting information is greater than a priority of the first reporting information.

Optionally, a priority of the first reporting information corresponding to a target RS of each neighbor cell is determined by any one of the following:
a cell identifier of each neighbor cell;
a distance between each neighbor cell and the serving cell;
cell channel quality obtained through layer 3 filtering;
beam quality obtained through layer 1 filtering;
beam quality obtained through layer 3 filtering;
a cell priority configured by a network device; and
a priority determined by the terminal according to a preset rule.

Optionally, the target RS meets any one of the following:
first L RSs with beam quality sorted from high to low in a target neighbor cell, where L is a positive integer;
L RSs in the target neighbor cell;
1 RS in K RSs in the target neighbor cell, where beam quality of the 1 RS is used for indicating average beam quality of the K RSs, and K is a positive integer; and
L RSs with beam quality greater than a fourth preset value in the target neighbor cell, where
the target neighbor cell is a neighbor cell in which the target RS is located.

Optionally, the K RSs include any one of the following:
all RSs of the target neighbor cell;
first K RSs with beam quality sorted from high to low in all the RSs of the target neighbor cell; and
K RSs in all the RSs of the target neighbor cell.

Optionally, in a case that RSs with beam quality greater than a fifth preset value exist in the RSs of the target neighbor cell, the K RSs include any one of the following:
all RSs in a third RS;
first K RSs with beam quality sorted from high to low in the third RS; and
K RSs in the third RS, where
the third RS is all RSs with beam quality greater than the fifth preset value in all the RSs of the target neighbor cell.

Optionally, in a case that RSs with beam quality greater than the fifth preset value do not exist in the RSs of the target neighbor cell, the K RSs include any one of the following:
all RSs of the target neighbor cell;
first K RSs with beam quality sorted from high to low in all the RSs of the target neighbor cell; and
K RSs in all the RSs of the target neighbor cell.

Optionally, before the receiving a CSI report sent by the terminal at a physical layer, the method further includes:
sending CSI reporting configuration to the terminal, used for configuring the terminal to report the first reporting information at the physical layer, where a report quantity in the CSI reporting configuration is configured as any one of the following:
none;
cri-RSRP;
ssb-Index-RSRP;
cri-SINR; and
ssb-Index-SINR.

Optionally, in a case that group-based beam reporting in the CSI reporting configuration is configured to be enabled, the CSI report further includes second reporting information corresponding to RSs of the serving cell.

It should be noted that, this embodiment is an implementation of the network device corresponding to the embodiment shown in FIG. 2. For a specific implementation, refer to the related description of the embodiment shown in FIG. 2, and the same beneficial effects can be achieved. To avoid repetition, details are not described herein again.

Referring to FIG. 4, FIG. 4 is a structural diagram of a terminal according to an embodiment of the present invention. As shown in FIG. 4, the terminal 400 includes:

a first sending module 401, configured to send a channel state information CSI report to a serving cell at a physical layer, where the CSI report includes first reporting information corresponding to a target reference signal RS of a neighbor cell.

Optionally, that the first sending module 401 is specifically configured to send a CSI report to a serving cell at a physical layer includes any one of the following:

sending, by the terminal, the CSI report to the serving cell at the physical layer through protocol default;

triggering, according to target signaling sent by a network device, the terminal to send the CSI report to the serving cell at the physical layer;

triggering, according to target configuration sent by the network device, the terminal to send the CSI report to the serving cell at the physical layer;

triggering, in a case that a first preset condition is met, the terminal to send the CSI report to the serving cell at the physical layer; and sending the channel state information CSI report to the serving cell at the physical layer in a case that the terminal determines that the first reporting information is sent at the physical layer.

Optionally, the target signaling meets any one of the following:

being used for configuring, activating, or updating N neighbor cells, where N is a positive integer;

being used for indicating dual active protocol stack handover; and being used for configuring a secondary cell group.

Optionally, the target configuration includes any one of the following:

CSI measurement configuration, where the CSI measurement configuration indicates a neighbor cell;

CSI reporting configuration, where the CSI reporting configuration indicates a neighbor cell;

CSI resource setting, where the CSI resource setting indicates a neighbor cell;

non-zero-power CSI reference signal resource set configuration, where the non-zero-power CSI reference signal resource set configuration indicates a neighbor cell; and CSI synchronization signal block resource set configuration, where the CSI synchronization signal block resource set configuration indicates a neighbor cell.

Optionally, the first preset condition includes at least one of the following:

channel quality of the serving cell is less than a first preset value; and channel quality of Q neighbor cells is greater than a second preset value, and Q is a positive integer.

Optionally, the first reporting information includes at least one of the following:

first indication information, where the first indication information is used for indicating the neighbor cell;

a RS identifier; and beam quality.

Optionally, in a case that the CSI report includes continuous M pieces of first reporting information of a same neighbor cell, only target reporting information includes the first indication information, and the target reporting information includes at least one of the following:

a first piece of first reporting information in the M pieces of first reporting information; and a last piece of first reporting information in the M pieces of first reporting information, where M is an integer greater than 1.

Optionally, in a case that a second preset condition is met, the first reporting information includes at least one of the reference signal identifier and the beam quality, and the second preset condition includes any one of the following:

configuration information of the CSI report includes second indication information, where the second indication information is used for instructing the CSI report to report first reporting information corresponding to a target RS of at least one neighbor cell;

the terminal sends a notification message to a network device, the notification message is used for notifying the network device to report first reporting information corresponding to a target RS of one neighbor cell in the CSI report, and the notification message and the CSI report are carried in different signaling;

the configuration information of the CSI report includes a quantity of first RSs reported by the serving cell and/or a quantity of second RSs reported by the neighbor cell; and the CSI report includes the quantity of first RSs reported by the serving cell and/or the quantity of second RSs reported by the neighbor cell.

Optionally, the quantity of second RSs is determined according to preset parameters, and the preset parameters include:

a quantity of neighbor cells;

quantities of RSs reported by the neighbor cells;

a sum of the quantities of RSs reported by the neighbor cells; and a sum of quantities of RSs with beam quality exceeding a third preset value in the neighbor cells.

Optionally, the CSI report further includes second reporting information corresponding to a RS of the serving cell.

Optionally, a priority of the second reporting information is greater than a priority of the first reporting information.

Optionally, a priority of the first reporting information corresponding to a target RS of each neighbor cell is determined by any one of the following:

a cell identifier of each neighbor cell;

a distance between each neighbor cell and the serving cell;

cell channel quality obtained through layer 3 filtering;

beam quality obtained through layer 1 filtering;

beam quality obtained through layer 3 filtering;

a cell priority configured by a network device; and a priority determined by the terminal according to a preset rule.

Optionally, the target RS meets any one of the following:

first L RSs with beam quality sorted from high to low in a target neighbor cell, where L is a positive integer;

L RSs in the target neighbor cell;

1 RS in K RSs in the target neighbor cell, where beam quality of the 1 RS is used for indicating average beam quality of the K RSs, and K is a positive integer; and L RSs with beam quality greater than a fourth preset value in the target neighbor cell, where the target neighbor cell is a neighbor cell in which the target RS is located.

Optionally, the K RSs include any one of the following:
all RSs of the target neighbor cell;
first K RSs with beam quality sorted from high to low in all the RSs of the target neighbor cell; and
K RSs in all the RSs of the target neighbor cell.

Optionally, in a case that RSs with beam quality greater than a fifth preset value exist in the RSs of the target neighbor cell, the K RSs include any one of the following:
all RSs in a third RS;
first K RSs with beam quality sorted from high to low in the third RS; and
K RSs in the third RS, where
the third RS is all RSs with beam quality greater than the fifth preset value in all the RSs of the target neighbor cell.

Optionally, in a case that RSs with beam quality greater than the fifth preset value do not exist in the RSs of the target neighbor cell, the K RSs include any one of the following:
all RSs of the target neighbor cell;
first K RSs with beam quality sorted from high to low in all the RSs of the target neighbor cell; and
K RSs in all the RSs of the target neighbor cell.

Optionally, the terminal further includes:
a first receiving module, configured to receive CSI reporting configuration sent by a network device, used for configuring the terminal to report the first reporting information at the physical layer, and a report quantity in the CSI reporting configuration is configured as any one of the following:
none;
cri-RSRP;
ssb-Index-RSRP;
cri-SINR; and
ssb-Index-SINR.

Optionally, in a case that group-based beam reporting in the CSI reporting configuration is configured to be enabled, the CSI report further includes second reporting information corresponding to RSs of the serving cell.

The terminal provided in the embodiments of the present invention can implement various processes implemented by the terminal in the method embodiment of FIG. 2. To avoid repetition, details are not described herein again.

Figure 5:
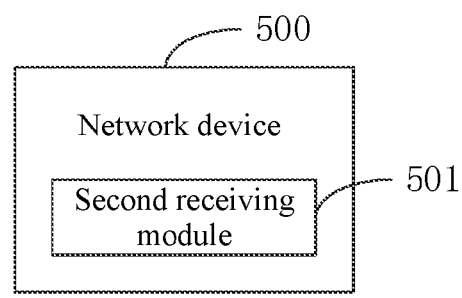
FIG. 5 is a structural diagram of a network device according to an embodiment of the present invention.

Referring to FIG. 5, FIG. 5 is a structural diagram of a network device according to an embodiment of the present invention. As shown in FIG. 5, the network device 500 includes:
a second receiving module 501, configured to receive a CSI report sent by a terminal at a physical layer, where the CSI report includes first reporting information corresponding to a target reference signal RS of a neighbor cell.

Optionally, the receiving a CSI report sent by the terminal at a physical layer meets any one of the following:
sending, by the terminal, the CSI report to the serving cell at the physical layer through protocol default;
sending target signaling to the terminal, to trigger the terminal to send the CSI report to the serving cell at the physical layer;
sending target configuration to the terminal, to trigger the terminal to send the CSI report to the serving cell at the physical layer;
triggering, in a case that a first preset condition is met, the terminal to send the CSI report to the serving cell at the physical layer; and
sending, by the terminal, the channel state information CSI report to the serving cell at the physical layer in a case that the terminal determines that the first reporting information is sent at the physical layer.

Optionally, the target signaling meets any one of the following:
being used for configuring, activating, or updating N neighbor cells, where N is a positive integer;
being used for indicating dual active protocol stack handover; and
being used for configuring a secondary cell group.

Optionally, the target configuration includes any one of the following:
CSI measurement configuration, where the CSI measurement configuration indicates a neighbor cell;
CSI reporting configuration, where the CSI reporting configuration indicates a neighbor cell;
CSI resource setting, where the CSI resource setting indicates a neighbor cell;
non-zero-power CSI reference signal resource set configuration, where the non-zero-power CSI reference signal resource set configuration indicates a neighbor cell; and
CSI synchronization signal block resource set configuration, where the CSI synchronization signal block resource set configuration indicates a neighbor cell.

Optionally, the first preset condition includes at least one of the following:
channel quality of the serving cell is less than a first preset value; and
channel quality of Q neighbor cells is greater than a second preset value, and Q is a positive integer.

Optionally, the first reporting information includes at least one of the following:
first indication information, where the first indication information is used for indicating the neighbor cell;
a RS identifier; and
beam quality.

Optionally, in a case that the CSI report includes continuous M pieces of first reporting information of a same neighbor cell, only target reporting information includes the first indication information, and the target reporting information includes at least one of the following:
a first piece of first reporting information in the M pieces of first reporting information; and
a last piece of first reporting information in the M pieces of first reporting information, where
M is an integer greater than 1.

Optionally, in a case that a second preset condition is met, the first reporting information includes at least one of the reference signal identifier and the beam quality, and the second preset condition includes any one of the following:
configuration information of the CSI report includes second indication information, where the second indication information is used for instructing the CSI report to report first reporting information corresponding to a target RS of at least one neighbor cell;
the terminal sends a notification message to a network device, the notification message is used for notifying the network device to report first reporting information corresponding to a target RS of one neighbor cell in the CSI report, and the notification message and the CSI report are carried in different signaling;
the configuration information of the CSI report includes a quantity of first RSs reported by the serving cell and/or a quantity of second RSs reported by the neighbor cell; and the CSI report includes the quantity of first RSs reported by the serving cell and/or the quantity of second RSs reported by the neighbor cell.

Optionally, the quantity of second RSs is determined according to preset parameters, and the preset parameters include:
a quantity of neighbor cells;
quantities of RSs reported by the neighbor cells;
a sum of the quantities of RSs reported by the neighbor cells; and
a sum of quantities of RSs with beam quality exceeding a third preset value in the neighbor cells.

Optionally, the CSI report further includes second reporting information corresponding to a RS of the serving cell.

Optionally, a priority of the second reporting information is greater than a priority of the first reporting information.

Optionally, a priority of the first reporting information corresponding to a target RS of each neighbor cell is determined by any one of the following:
a cell identifier of each neighbor cell;
a distance between each neighbor cell and the serving cell;
cell channel quality obtained through layer 3 filtering;
beam quality obtained through layer 1 filtering;
beam quality obtained through layer 3 filtering;
a cell priority configured by a network device; and
a priority determined by the terminal according to a preset rule.

Optionally, the target RS meets any one of the following:
first L RSs with beam quality sorted from high to low in a target neighbor cell, where L is a positive integer;
L RSs in the target neighbor cell;
1 RS in K RSs in the target neighbor cell, where beam quality of the 1 RS is used for indicating average beam quality of the K RSs, and K is a positive integer; and
L RSs with beam quality greater than a fourth preset value in the target neighbor cell, where
the target neighbor cell is a neighbor cell in which the target RS is located.

Optionally, the K RSs include any one of the following:
all RSs of the target neighbor cell;
first K RSs with beam quality sorted from high to low in all the RSs of the target neighbor cell; and
K RSs in all the RSs of the target neighbor cell.

Optionally, in a case that RSs with beam quality greater than a fifth preset value exist in the RSs of the target neighbor cell, the K RSs include any one of the following:
all RSs in a third RS;
first K RSs with beam quality sorted from high to low in the third RS; and
K RSs in the third RS, where
the third RS is all RSs with beam quality greater than the fifth preset value in all the RSs of the target neighbor cell.

Optionally, in a case that RSs with beam quality greater than the fifth preset value do not exist in the RSs of the target neighbor cell, the K RSs include any one of the following:
all RSs of the target neighbor cell;
first K RSs with beam quality sorted from high to low in all the RSs of the target neighbor cell; and
K RSs in all the RSs of the target neighbor cell.

Optionally, the network device further includes:
a second sending module, configured to send CSI reporting configuration to the terminal, used for configuring the terminal to report the first reporting information at the physical layer, where a report quantity in the CSI reporting configuration is configured as any one of the following:
none;
cri-RSRP;
ssb-Index-RSRP;
cri-SINR; and
ssb-Index-SINR.

Optionally, in a case that group-based beam reporting in the CSI reporting configuration is configured to be enabled, the CSI report further includes second reporting information corresponding to RSs of the serving cell.

The network device provided in the embodiments of the present invention can implement various processes implemented by the network device in the method embodiment of FIG. 3. To avoid repetition, details are not described herein again.

Figure 6:
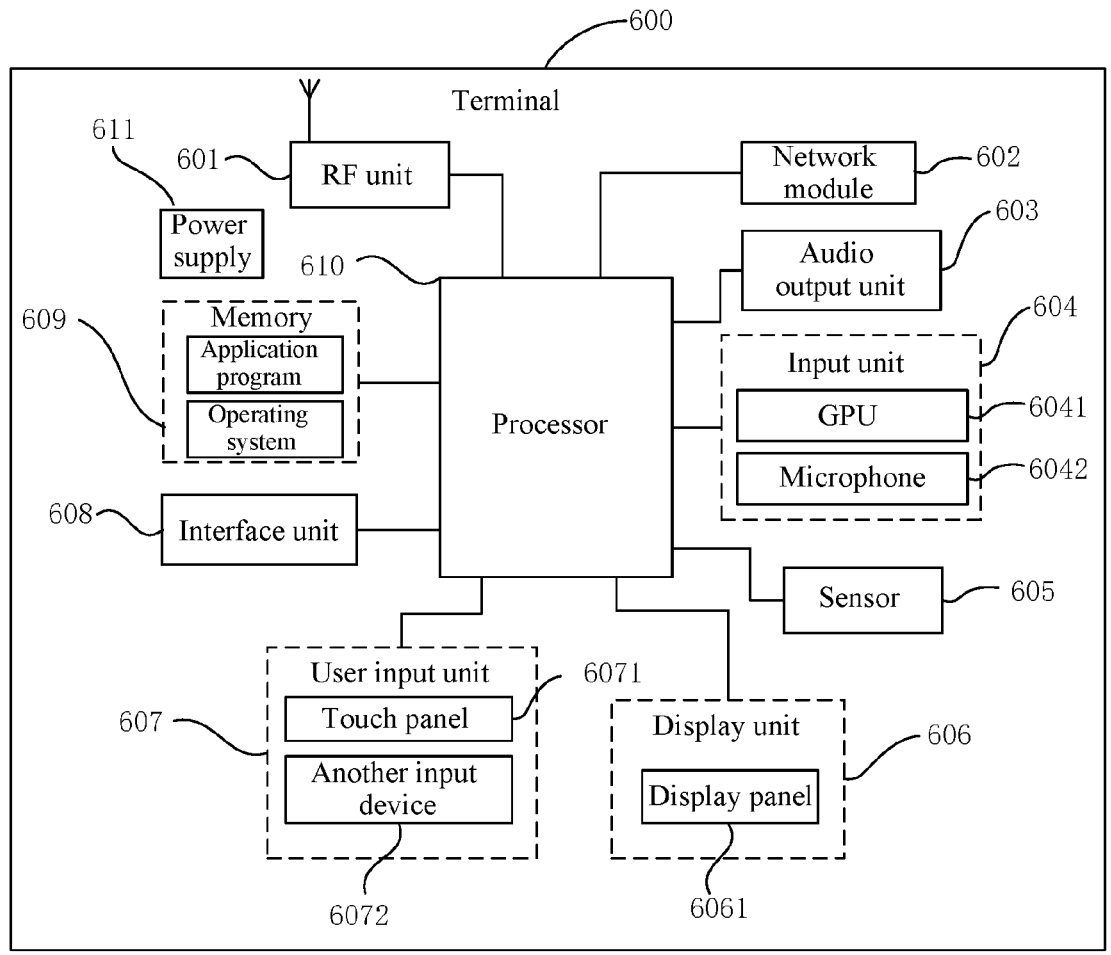
FIG. 6 is a structural diagram of another terminal according to an embodiment of the present invention.

FIG. 6 is a schematic structural diagram of hardware of a terminal for implementing embodiments of the present invention.

The terminal 600 includes, but is not limited to, components such as a radio frequency (RF) unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the terminal structure shown in FIG. 6 does not constitute a limitation on the terminal, and the terminal may include more or fewer components than shown, or combine some components, or have different component arrangements. In this embodiment of the present invention, the terminal includes, but is not limited to, a mobile phone, a tablet computer, a notebook computer, a palmtop computer, an in-vehicle terminal, a wearable device, a pedometer, and the like.

The RF unit 601 sends a CSI report to a serving cell at a physical layer, where the CSI report includes first reporting information corresponding to a target reference signal RS of a neighbor cell.

It should be understood that, in this embodiment, the processor 610 and the RF unit 601 can implement various processes implemented by the terminal in the method embodiment of FIG. 2. To avoid repetition, details are not described herein again.

It may be understood that, in this embodiment of the present invention, the RF unit 601 may be configured to send and receive information or send and receive a signal during a call, and specifically, after receiving downlink data from a base station, send the downlink data to the processor 610 for processing. In addition, the RF circuit transmits uplink data to the base station. Generally, the RF unit 601 includes, but is not limited to, an antenna, at least one amplifier, a transceiver, a coupler, a low noise amplifier, a duplexer, and the like. In addition, the RF unit 601 may further communicate with a network and another device through a wireless communication system.

The terminal may provide, by using the network module 602, wireless broadband Internet access for a user, for example, help the user to receive or send an email, browse a webpage, and access stream media.

The audio output unit 603 may convert audio data received by the RF unit 601 or the network module 602 or stored in the memory 609 into an audio signal and output the audio signal as sound. In addition, the audio output unit 603 may further provide audio output related to specific functions implemented by the terminal 600 (for example, a call signal receiving sound and a message receiving sound). The audio output unit 603 includes a speaker, a buzzer, a receiver, and the like.

An input unit 604 is configured to receive an audio signal or a video signal. The input unit 604 may include a graphics processing unit (GPU) 6041 and a microphone 6042. The graphics processing unit 6041 performs processing on image data of a static picture or a video that is obtained by an image acquisition device (for example, a camera) in a video acquisition mode or an image acquisition mode. An image frame that has been processed may be displayed on a display unit 606. The image frame that has been processed by the GPU 6041 may be stored in the memory 609 (or another storage medium) or sent by using the RF unit 601 or the network module 602. The microphone 6042 may receive a sound, and can process the sound into audio data. The processed audio data may be converted, in a phone talk mode, into a format that may be sent to a mobile communication base station via the RF unit 601 for output.

The terminal 600 further includes at least one sensor 605 such as an optical sensor, a motion sensor, or another sensor. Specifically, the optical sensor includes an ambient light sensor and a proximity sensor. The ambient light sensor may adjust luminance of the display panel 6061 according to brightness of the ambient light. The proximity sensor may switch off the display panel 6061 and/or backlight when the terminal 600 is moved to the ear. As one type of motion sensor, an accelerometer sensor can detect magnitudes of accelerations in various directions (generally, on three axes), may detect a magnitude and a direction of the gravity when static, and may be applied to recognizing the attitude of the terminal (for example, switching between landscape orientation and portrait orientation, a related game, and magnetometer attitude calibration), a function related to vibration recognition (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, and the like, which have not been described herein in detail.

The display unit 606 is configured to display information input by the user or information provided for the user. The display unit 606 may include a display panel 6061. The display panel 6061 may be configured by using a liquid crystal display (LCD), an organic light-emitting diode (OLED), or the like.

The user input unit 607 may be configured to receive input digit or character information, and generate a keyboard signal input related to the user setting and function control of the terminal. Specifically, the user input unit 607 includes a touch panel 6071 and another input device 6072. The touch panel 6071, also referred to as a touchscreen, may collect a touch operation of a user on or near the touch panel (such as an operation of a user on or near the touch panel 6071 by using any suitable object or attachment, such as a finger or a touch pen). The touch panel 6071 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 610. Moreover, the touch controller may receive and execute a command transmitted from the processor 610. In addition, the touch panel 6071 may be implemented by using various types, such as a resistive type, a capacitive type, an infrared type, and a surface acoustic wave type. In addition to the touch panel 6071, the user input unit 607 may further include the another input device 6072. Specifically, the another input device 6072 may include, but is not limited to, a physical keyboard, a functional key (such as a volume control key or a switch key), a track ball, a mouse, and a joystick, which are not described herein in detail.

Further, the touch panel 6071 may cover the display panel 6061. After detecting a touch operation on or near the touch panel 6071, the touch panel transfers the touch operation to the processor 610, to determine a type of a touch event. Then, the processor 610 provides a corresponding visual output on the display panel 6061 according to the type of the touch event. In FIG. 6, the touch panel 6071 and the display panel 6061 implement, as two independent parts, input and output functions of the terminal. However, in some embodiments, the touch panel 6071 and the display panel 6061 may be integrated to implement the input and output functions of the terminal. The details are not limited herein.

The interface unit 608 is an interface for connecting an external apparatus and the terminal 600. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 608 may be configured to receive input (for example, data information or power) from an external apparatus and transmit the received input to one or more elements in the terminal 600 or may be configured to transmit data between the terminal 600 and the external apparatus.

The memory 609 may be configured to store a software program and various data. The memory 609 may mainly include a program storage area and a data storage area. The program storage area may store an operating system, an application program required by at least one function (such as a sound playback function and an image display function), and the like. The data storage area may store data (for example, audio data and an address book) created according to the use of the mobile phone, and the like. In addition, the memory 609 may include a high speed random access memory (RAM), and may further include a non-volatile memory, such as at least one magnetic disk storage device, a flash memory or another volatile solid-state storage device.

The processor 610 is a control center of the terminal, and connects to various parts of the terminal by using various interfaces and lines. By running or executing the software program and/or module stored in the memory 609, and invoking data stored in the memory 609, the processor performs various functions and data processing of the terminal, thereby performing overall monitoring on the terminal. The processor 610 may include one or more processing units. Preferably, the processor 610 may integrate an application processor and a modem processor. The application processor mainly processes an operating system, a user interface, an application program, and the like. The modem processor mainly processes wireless communication. It may be understood that the foregoing modem processor may not be integrated into the processor 610.

The terminal 600 may further include the power supply 611 (such as a battery) for supplying power to the components. Preferably, the power supply 611 may be logically connected to the processor 610 by using a power management system, thereby implementing functions such as charging, discharging, and power consumption management by using the power management system.

In addition, the terminal 600 includes some functional module that are not shown, which are not described herein in detail.

Preferably, the embodiments of the present invention further provide a terminal, including a processor 610, a memory 609, and a computer program stored in the memory 609 and runnable on the processor 610. The computer program, when executed by the processor 610, implements various processes of the embodiments of the foregoing CSI report sending method, and can achieve the same technical effects. To avoid repetition, details are not described herein again.

Figure 7:
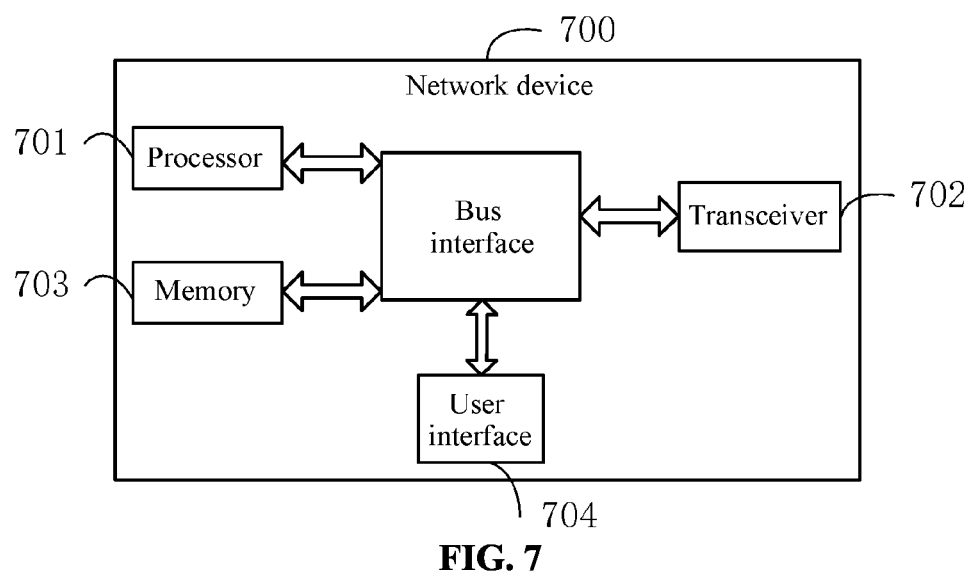
FIG. 7 is a structural diagram of another network device according to an embodiment of the present invention.

Referring to FIG. 7, FIG. 7 is a structural diagram of another network device according to an embodiment of the present invention. As shown in FIG. 7, the network device 700 includes: a processor 701, a transceiver 702, a memory 703, and a bus system.

The transceiver 702 is configured to receive a CSI report sent by a terminal at a physical layer, where the CSI report includes first reporting information corresponding to a target reference signal RS of a neighbor cell.

It should be understood that, in this embodiment, the processor 701 and the transceiver 702 can implement various processes implemented by the network device in the method embodiment of FIG. 3. To avoid repetition, details are not described herein again.

In FIG. 7, a bus architecture may include any quantity of interconnected buses and bridges, and specifically connects together circuits that are of one or more processors represented by the processor 701 and of a memory represented by the memory 703. The bus architecture may further connect various other circuits of a peripheral, a voltage regulator, a power management circuit, and the like. This is well known in the art, and therefore, no further description is provided in this specification. The bus interface provides an interface. The transceiver 702 may be a plurality of components, including a transmitter and a receiver, and providing units for communicating with various other apparatuses on a transmission medium. For different UEs, the user interface 704 may be an interface capable of externally or internally connecting a required device, the connected device includes, but not limited to, a keypad, a display, a speaker, a microphone, and a joystick.

The processor 701 is responsible for the management of the bus architecture and normal processing, and the memory 703 may store data used when the processor 701 performs an operation.

Preferably, the embodiments of the present invention further provide a network device, including a processor 701, a memory 703, and a computer program stored in the memory 703 and runnable on the processor 701. The computer program, when executed by the processor 701, implements various processes in the embodiments of the foregoing CSI report receiving method, and can achieve the same technical effects. To avoid repetition, details are not described herein again.

The embodiments of the present invention further provide a computer-readable storage medium, storing a computer program. The computer program, when executed by a processor, implements various processes in the embodiment of the CSI report receiving method on the network device side according to the embodiments of the present invention; or the computer program, when executed by a processor, implements various processes in the embodiment of the CSI report sending method on the terminal side according to the embodiments of the present invention, and can achieve the same technical effects. To avoid repetition, details are not described herein again. The computer-readable storage medium may include a flash drive, a read-only memory (ROM), a RAM, a magnetic disk, or an optical disc.

It should be noted that, the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one . . . " does not exclude that there are still other same elements in the processes, methods, objects, or apparatuses.

Through the foregoing description on the implementations, a person skilled in the art can clearly learn that the method according to the foregoing embodiments may be implemented by software and a necessary universal hardware platform, or by using hardware, but in many cases, the former is a preferred implementation. Based on such understanding, the technical solutions of the present invention or a part thereof that makes a contribution to the prior art may be essentially embodied in a form of a software product. The computer software product is stored in a storage medium (such as a ROM/RAM, a disk, and an optical disk), including several instructions to enable one terminal (which may be a mobile phone, a computer, a server, an air conditioner a base station, or the like) to perform the methods in the embodiments of the present invention.

The embodiments of the present invention are described above with reference to the accompanying drawings. However, the present invention is not limited to the foregoing specific implementations. The foregoing specific implementations are illustrative instead of limitative. Those of ordinary skill in the art may make various variations under the teaching of the present invention without departing from the spirit of the present invention and the protection scope of the claims, and such variations shall all fall within the protection scope of the present invention.

What is claimed is:

1. A neighbor cell channel state information (CSI) report sending method, applicable to a terminal, the method comprising:
    sending a CSI report to a serving cell at a physical layer, wherein the CSI report comprises first reporting information corresponding to a target reference signal RS of the neighbor cell;
    wherein the sending a CSI report to a serving cell at a physical layer comprises:
    triggering, according to target signaling sent by a network device and target configuration sent by the network device, the terminal to send the CSI report to the serving cell at the physical layer;
    wherein the target signaling is used for configuring N neighbor cells, wherein N is a positive integer, wherein N is a positive integer;
    wherein the target configuration comprises CSI synchronization signal block resource set configuration, wherein the CSI synchronization signal block resource set configuration indicates a neighbor cell.

2. The method according to claim 1, wherein the sending a CSI report to a serving cell at a physical layer further comprises any one of the following:
    sending, by the terminal, the CSI report to the serving cell at the physical layer through protocol default;

triggering, in a case that a first preset condition is met, the terminal to send the CSI report to the serving cell at the physical layer; and sending the channel state information (CSI) report to the serving cell at the physical layer in a case that the terminal determines that the first reporting information is sent at the physical layer.

3. The method according to claim 2, wherein the target signaling meets any one of the following:

being used for activating, or updating N neighbor cells;

being used for indicating dual active protocol stack handover; and being used for configuring a secondary cell group.

4. The method according to claim 2, wherein the target configuration further comprises any one of the following:

CSI measurement configuration, wherein the CSI measurement configuration indicates a neighbor cell;

CSI reporting configuration, wherein the CSI reporting configuration indicates a neighbor cell;

CSI resource setting, wherein the CSI resource setting indicates a neighbor cell; and non-zero-power CSI reference signal resource set configuration, wherein the non-zero-power CSI reference signal resource set configuration indicates a neighbor cell.

5. The method according to claim 1, wherein the first reporting information comprises at least one of the following:

first indication information, wherein the first indication information is used for indicating the neighbor cell;

a RS identifier; and beam quality.

6. The method according to claim 5, wherein in a case that the CSI report comprises continuous M pieces of first reporting information of a same neighbor cell, only target reporting information comprises the first indication information, and the target reporting information comprises at least one of the following:

a first piece of first reporting information in the M pieces of first reporting information; and a last piece of first reporting information in the M pieces of first reporting information, wherein M is an integer greater than 1.

7. The method according to claim 5, wherein in a case that a second preset condition is met, the first reporting information comprises at least one of the reference signal identifier and the beam quality, and the second preset condition comprises any one of the following:

configuration information of the CSI report comprises second indication information, wherein the second indication information is used for instructing the CSI report to report first reporting information corresponding to a target RS of at least one neighbor cell;

the terminal sends a notification message to a network device, the notification message is used for notifying the network device to report first reporting information corresponding to a target RS of one neighbor cell in the CSI report, and the notification message and the CSI report are carried in different signaling;

the configuration information of the CSI report comprises a quantity of first RSs reported by the serving cell and/or a quantity of second RSs reported by the neighbor cell; and the CSI report comprises the quantity of first RSs reported by the serving cell and/or the quantity of second RSs reported by the neighbor cell.

8. The method according to claim 1, wherein before the sending a channel state information (CSI) report to a serving cell at a physical layer, the method further comprises:

receiving CSI reporting configuration sent by a network device, used for configuring the terminal to report the first reporting information at the physical layer, wherein a report quantity in the CSI reporting configuration is configured as any one of the following:

none;

channel state information reference signal resource indication-reference signal received power (cri-RSRP);

synchronization signal block-index-RSRP (ssb-Index-RSRP);

channel state information reference signal resource indication-signal to interference plus noise ratio (cri-SINR); and synchronization signal block-index-signal to interference plus noise ratio (ssb-Index-SINR).

9. The method according to claim 8, wherein in a case that group-based beam reporting in the CSI reporting configuration is configured to be enabled, the CSI report further comprises second reporting information corresponding to a RS of the serving cell.

10. A neighbor cell channel state information (CSI) report receiving method, applicable to a network device of a serving cell to which a terminal belongs, the method comprising:

receiving a CSI report sent by the terminal at a physical layer, wherein the CSI report comprises first reporting information corresponding to a target reference signal RS of a neighbor cell;

wherein the receiving a CSI report sent by the terminal at a physical layer meets:

sending target signaling and target configuration to the terminal, to trigger the terminal to send the CSI report to the serving cell at the physical layer;

wherein the target signaling is used for configuring N neighbor cells, wherein N is a positive integer, wherein N is a positive integer;

wherein the target configuration comprises CSI synchronization signal block resource set configuration, wherein the CSI synchronization signal block resource set configuration indicates a neighbor cell.

11. The method according to claim 10, wherein the receiving a CSI report sent by the terminal at a physical layer further meets any one of the following:

sending, by the terminal, the CSI report to the serving cell at the physical layer through protocol default;

triggering, in a case that a first preset condition is met, the terminal to send the CSI report to the serving cell at the physical layer; and sending, by the terminal, the channel state information (CSI) report to the serving cell at the physical layer in a case that the terminal determines that the first reporting information is sent at the physical layer.

12. The method according to claim 11, wherein the target signaling further meets any one of the following:

being used for activating, or updating N neighbor cells;

being used for indicating dual active protocol stack handover; and being used for configuring a secondary cell group.

13. The method according to claim 11, wherein the target configuration further comprises any one of the following:

CSI measurement configuration, wherein the CSI measurement configuration indicates a neighbor cell;

CSI reporting configuration, wherein the CSI reporting configuration indicates a neighbor cell;

CSI resource setting, wherein the CSI resource setting indicates a neighbor cell; and non-zero-power CSI reference signal resource set configuration, wherein the non-zero-power CSI reference signal resource set configuration indicates a neighbor cell.

14. The method according to claim 10, wherein before the receiving a CSI report sent by the terminal at a physical layer, the method further comprises:

sending CSI reporting configuration to the terminal, used for configuring the terminal to report the first reporting information at the physical layer, wherein a report quantity in the CSI reporting configuration is configured as any one of the following:

none;

channel state information reference signal resource indication-reference signal received power (cri-RSRP);

synchronization signal block-index-RSRP (ssb-Index-RSRP);

channel state information reference signal resource indication-signal to interference plus noise ratio (cri-SINR); and synchronization signal block-index-signal to interference plus noise ratio (ssb-Index-SINR).

15. A terminal, comprising a memory, a processor, and a program stored in the memory and runnable on the processor, the program, when executed by the processor, implementing the following steps in the neighbor cell channel state information (CSI) report receiving method:

sending a CSI report to a serving cell at a physical layer, wherein the CSI report comprises first reporting information corresponding to a target reference signal (RS) of the neighbor cell;

wherein the program, when executed by the processor, implements the following:

triggering, according to target signaling sent by a network device and target configuration sent by the network device, the terminal to send the CSI report to the serving cell at the physical layer;

wherein the target signaling is used for configuring N neighbor cells, wherein N is a positive integer, wherein N is a positive integer;

wherein the target configuration comprises CSI synchronization signal block resource set configuration, wherein the CSI synchronization signal block resource set configuration indicates a neighbor cell.

16. The terminal according to claim 15, wherein the program, when executed by the processor, implements any one of the following:

sending, by the terminal, the CSI report to the serving cell at the physical layer through protocol default;

triggering, in a case that a first preset condition is met, the terminal to send the CSI report to the serving cell at the physical layer; and sending the channel state information (CSI) report to the serving cell at the physical layer in a case that the terminal determines that the first reporting information is sent at the physical layer.

17. The terminal according to claim 16, wherein the target signaling further meets any one of the following:

being used for activating, or updating N neighbor cells;

being used for indicating dual active protocol stack handover; and being used for configuring a secondary cell group.

18. The terminal according to claim 16, wherein the target configuration further comprises any one of the following:

CSI measurement configuration, wherein the CSI measurement configuration indicates a neighbor cell;

CSI reporting configuration, wherein the CSI reporting configuration indicates a neighbor cell;

CSI resource setting, wherein the CSI resource setting indicates a neighbor cell; and non-zero-power CSI reference signal resource set configuration, wherein the non-zero-power CSI reference signal resource set configuration indicates a neighbor cell.

19. The terminal according to claim 15, wherein the first reporting information comprises at least one of the following:

first indication information, wherein the first indication information is used for indicating the neighbor cell;

a RS identifier; and beam quality.

20. A network device, comprising a memory, a processor, and a program stored in the memory and runnable on the processor, the program, when executed by the processor, implementing the steps in the neighbor cell channel state information (CSI) report receiving method according to claim 10.

* * * * *